(12) United States Patent
Chin et al.

(10) Patent No.: US 10,179,648 B2
(45) Date of Patent: Jan. 15, 2019

(54) AIRBORNE DRONE LAUNCH AND RECOVERY APPARATUS

(71) Applicants: Howard Martin Chin, Kingston (JM); Kimberly A. Carraha, Weston, FL (US)

(72) Inventors: Howard Martin Chin, Kingston (JM); Kimberly A. Carraha, Weston, FL (US)

(*) Notice: Subject to any disclaimer, the term of this patent is extended or adjusted under 35 U.S.C. 154(b) by 215 days.

(21) Appl. No.: 15/176,250

(22) Filed: Jun. 8, 2016

(65) Prior Publication Data

US 2016/0355261 A1 Dec. 8, 2016

Related U.S. Application Data

(60) Provisional application No. 62/172,447, filed on Jun. 8, 2015.

(51) Int. Cl.
*B64D 5/00* (2006.01)
*B64C 39/02* (2006.01)

(52) U.S. Cl.
CPC .............. *B64D 5/00* (2013.01); *B64C 39/024* (2013.01); *B64C 2201/082* (2013.01); *B64C 2201/084* (2013.01); *B64C 2201/206* (2013.01)

(58) Field of Classification Search
CPC ........ B64C 2201/206; B64C 2201/082; B64C 39/00; B64C 2201/084; B64C 39/04; B64C 39/024; B64D 1/02; B64D 5/00; B64D 1/12; F41F 3/06
See application file for complete search history.

(56) References Cited

U.S. PATENT DOCUMENTS 3,003,717 A * 10/1961 Booker .................... B64D 5/00
  244/114 R
3,568,953 A * 3/1971 Beezley .................. B64C 29/00
  244/2

(Continued)

OTHER PUBLICATIONS

Linear Induction Motor, Wikipedia, Apr. 23, 2015, 6, Wikimedia Foundation, Inc.

(Continued)

*Primary Examiner* — Assres H Woldemaryam
(74) *Attorney, Agent, or Firm* — Walter | Haverfield LLP; D. Peter Hochberg; Sean F. Mellino

(57) ABSTRACT

An airborne drone launch and recovery apparatus for selectively launching drones located on the underside of a carrier aircraft or recovering drones following flight of the drones, the airborne launch and recovery apparatus has an extensible stinger slidable along the length of a stinger sheath between a retracted position proximal the rear portion of the carrier aircraft and an extended position in front of the carrier aircraft, and a catcher shuttle carried on the forward part of the stinger for extending into the non-turbulent air in front of the carrier aircraft when the stinger is in the extended position. The carrier shuttle includes a launch/recovery assembly for selectively either having a locked condition for the recovery guide of a drone prior to the positioning of the catcher shuttle in a selected for the launch of the drone, and having an open condition for receiving the recovery guide of a drone at the termination of the flight of the drone to terminate the flight.

12 Claims, 13 Drawing Sheets

(56) References Cited

U.S. PATENT DOCUMENTS

| | | | | |
|---|---|---|---|---|
| 4,462,560 | A * | 7/1984 | Earl | B64F 1/10 180/116 |
| 5,000,398 | A * | 3/1991 | Rashev | B64C 27/08 244/110 E |
| 6,293,487 | B1 * | 9/2001 | Gaite | B64D 5/00 244/3 |
| 7,793,888 | B2 * | 9/2010 | Padan | B64D 1/00 244/118.1 |
| 8,740,134 | B2 * | 6/2014 | Suzuki | B64C 37/02 244/110 F |
| 8,950,698 | B1 * | 2/2015 | Rossi | B64C 37/02 244/2 |
| 9,010,690 | B1 * | 4/2015 | Al-Heraibi | B64D 17/00 244/100 R |
| 9,139,309 | B1 * | 9/2015 | Al-Heraibi | B64F 1/10 |
| 9,387,940 | B2 * | 7/2016 | Godzdanker | B64F 1/125 |
| 2002/0074454 | A1 * | 6/2002 | Henderson | B64C 39/024 244/135 A |
| 2004/0232282 | A1 * | 11/2004 | Dennis | B63B 27/26 244/110 E |
| 2005/0151009 | A1 * | 7/2005 | Roeseler | B64C 39/024 244/63 |
| 2006/0102783 | A1 * | 5/2006 | Dennis | B64C 39/024 244/110 F |
| 2009/0294573 | A1 * | 12/2009 | Wilson | B64C 39/024 244/2 |
| 2010/0025523 | A1 * | 2/2010 | Kutzmann | B64C 39/024 244/2 |
| 2012/0187243 | A1 * | 7/2012 | Goldie | B64C 39/024 244/110 C |
| 2014/0158812 | A1 * | 6/2014 | Luther | B64C 39/10 244/2 |
| 2015/0101478 | A1 * | 4/2015 | Palmer | H01Q 15/14 89/1.82 |
| 2015/0336685 | A1 * | 11/2015 | Wan | B64G 1/005 244/2 |
| 2016/0214717 | A1 * | 7/2016 | De Silva | B64D 5/00 |

OTHER PUBLICATIONS

Electromagnetic Aircraft Launch System, Wikipedia, May 25, 2015, 6, Wikimedia Foundation, Inc.

Baldor's Motion Solutions Catalog, Linear Motors and Stages, Baldor Electric Company, 48.

Parasite Aircraft, Wikipedia, May 1, 2015, 3, Wikimedia Foundation, Inc.

Lenny Flank, Aircraft Carrier in the Sky: The F9C-2 "Parasite Fighter," Oct. 26, 2013, 13, Kos Media, LLC.

James Drew, DARPA selects industry teams for 'Gremlins' UAV project, Apr. 4, 2016, 6, Flightglobal, Washington DC, USA.

Gremlins Takes Flight to Provide Air-Recoverable Unmanned Air Systems, Mar. 31, 2016, 3, DARPA (Defense Advanced Research Projects Agency).

Joe Baugher, The History of the Convaie B-36 "Peacemaker", Feb. 10, 2014, 37, The 456th Fighter Interceptor Squadron.

Jared A. Zichek, Mother Ships Parasites & More: Selected USAF Strategic Bomber, XC Heavy Transport and Ficon Studies, 1945-1954, American Aerospace Archive 5 Magazine, 2010.

* cited by examiner

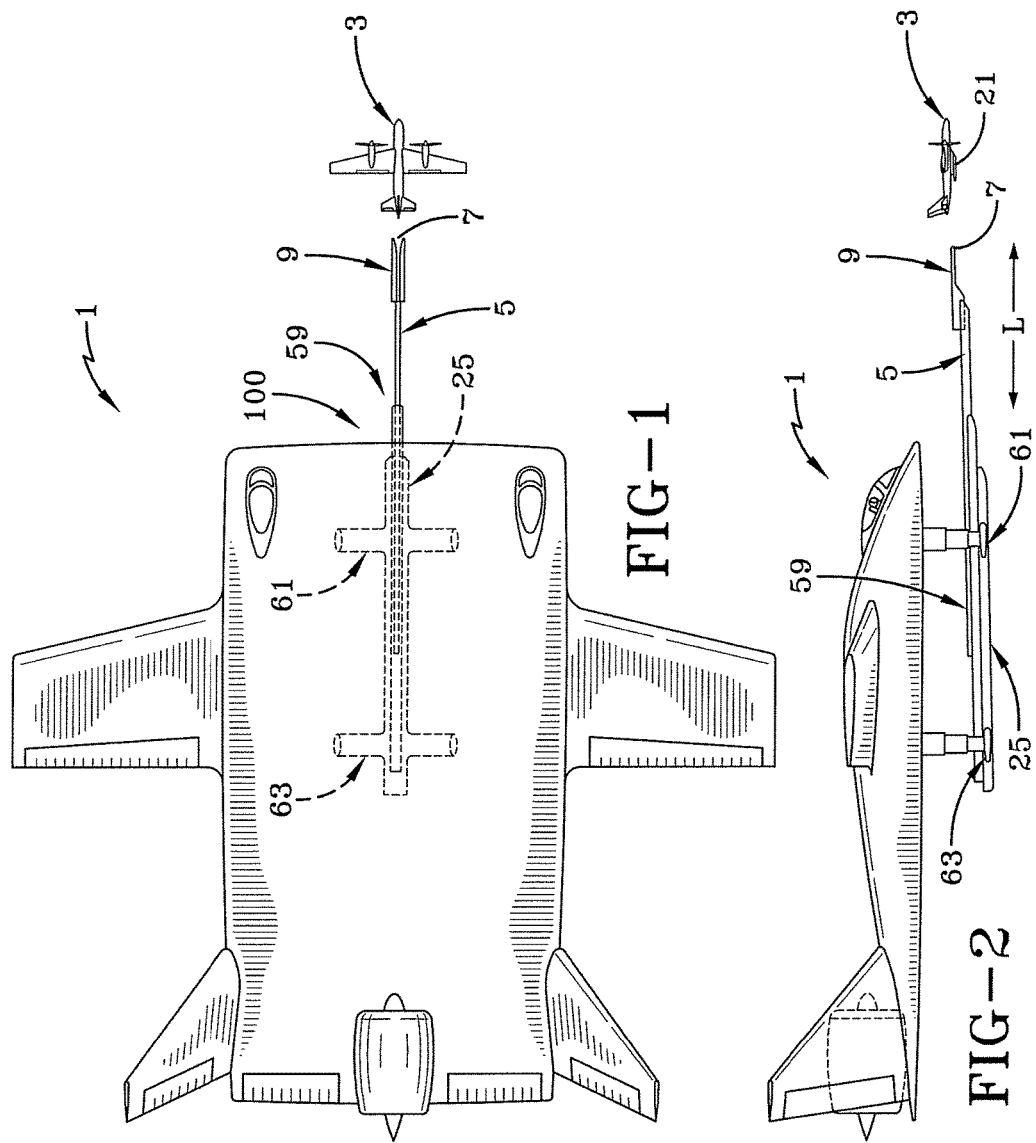

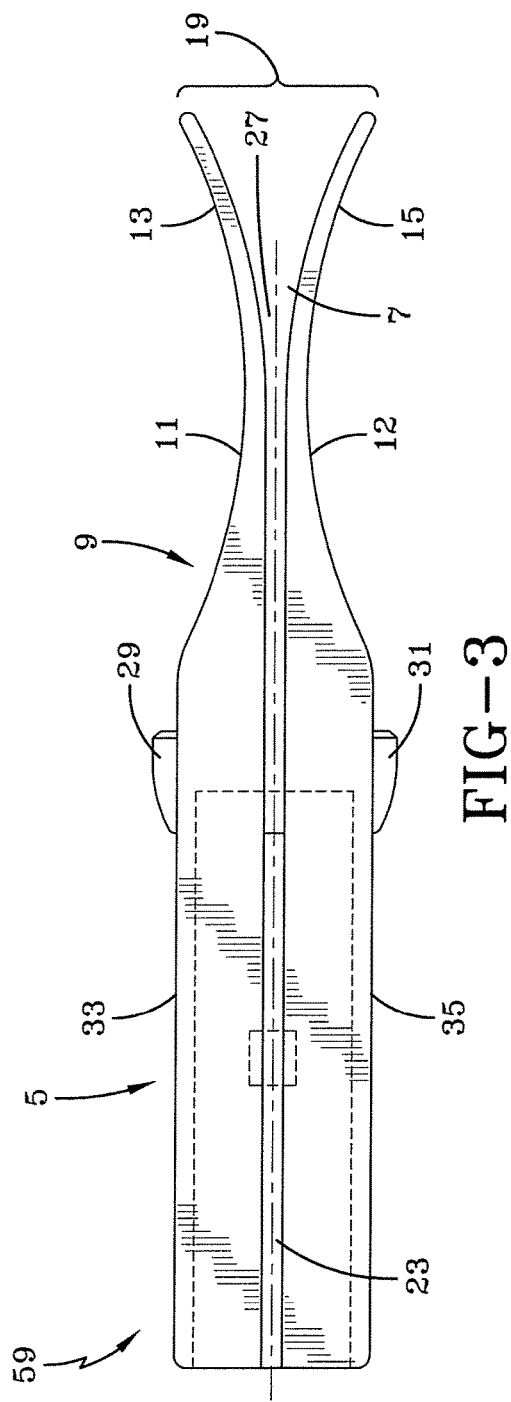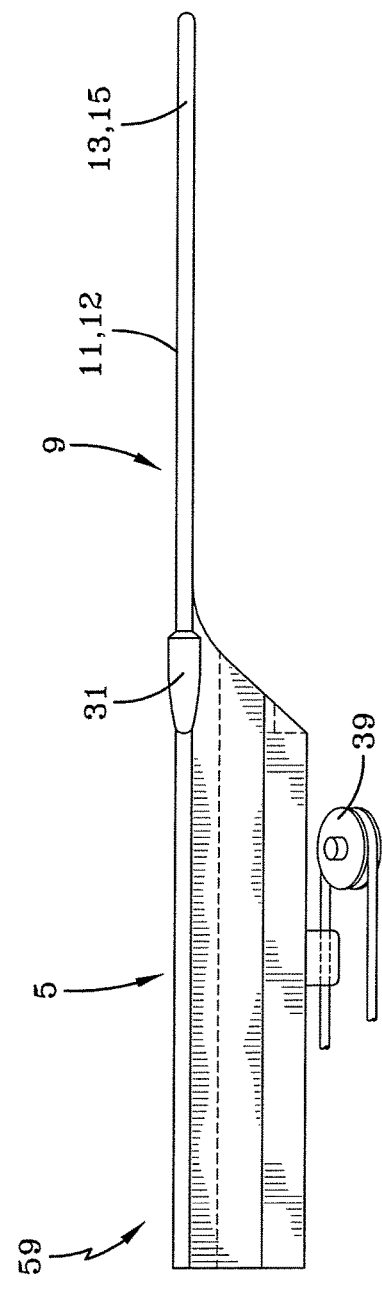

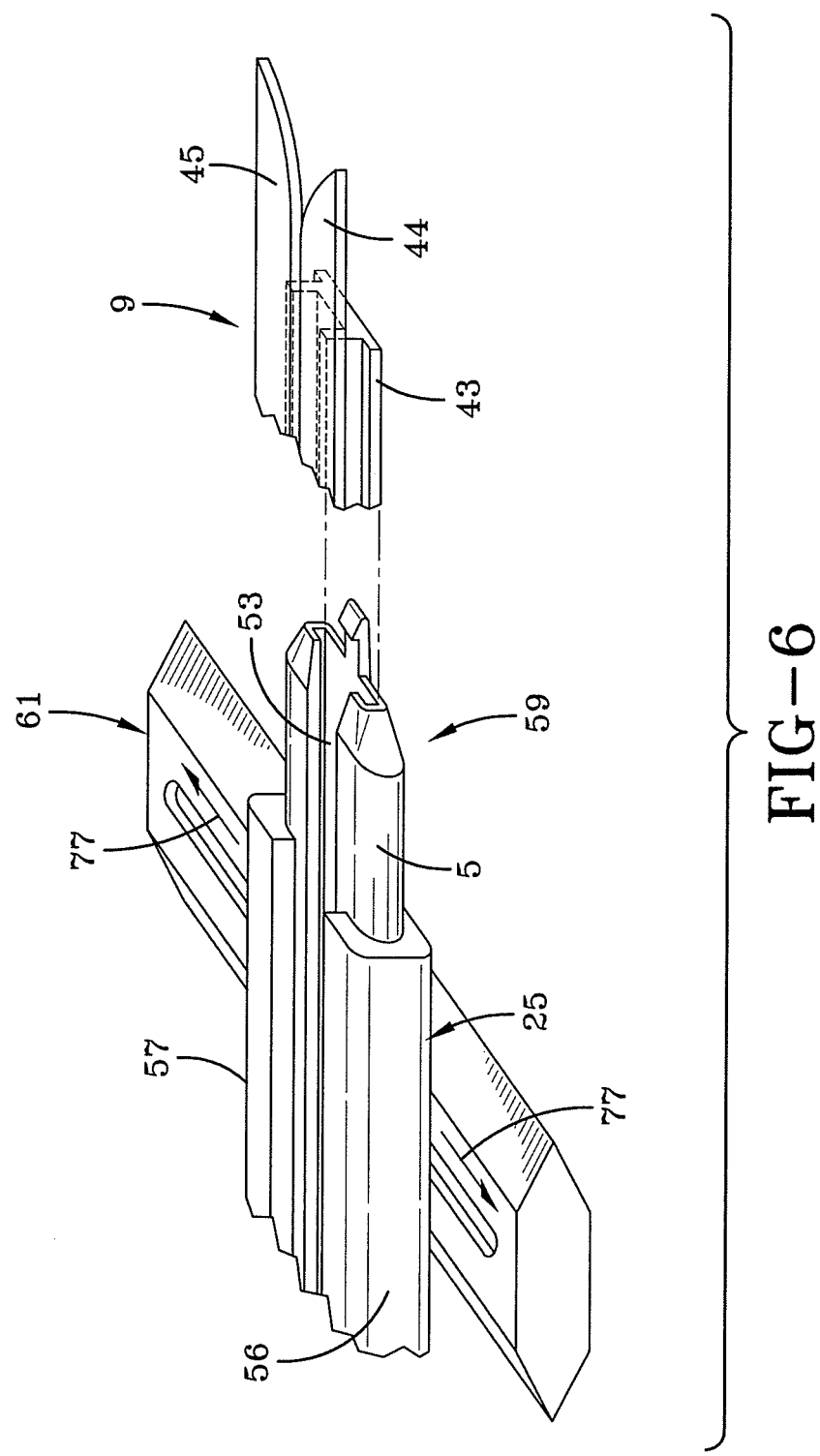

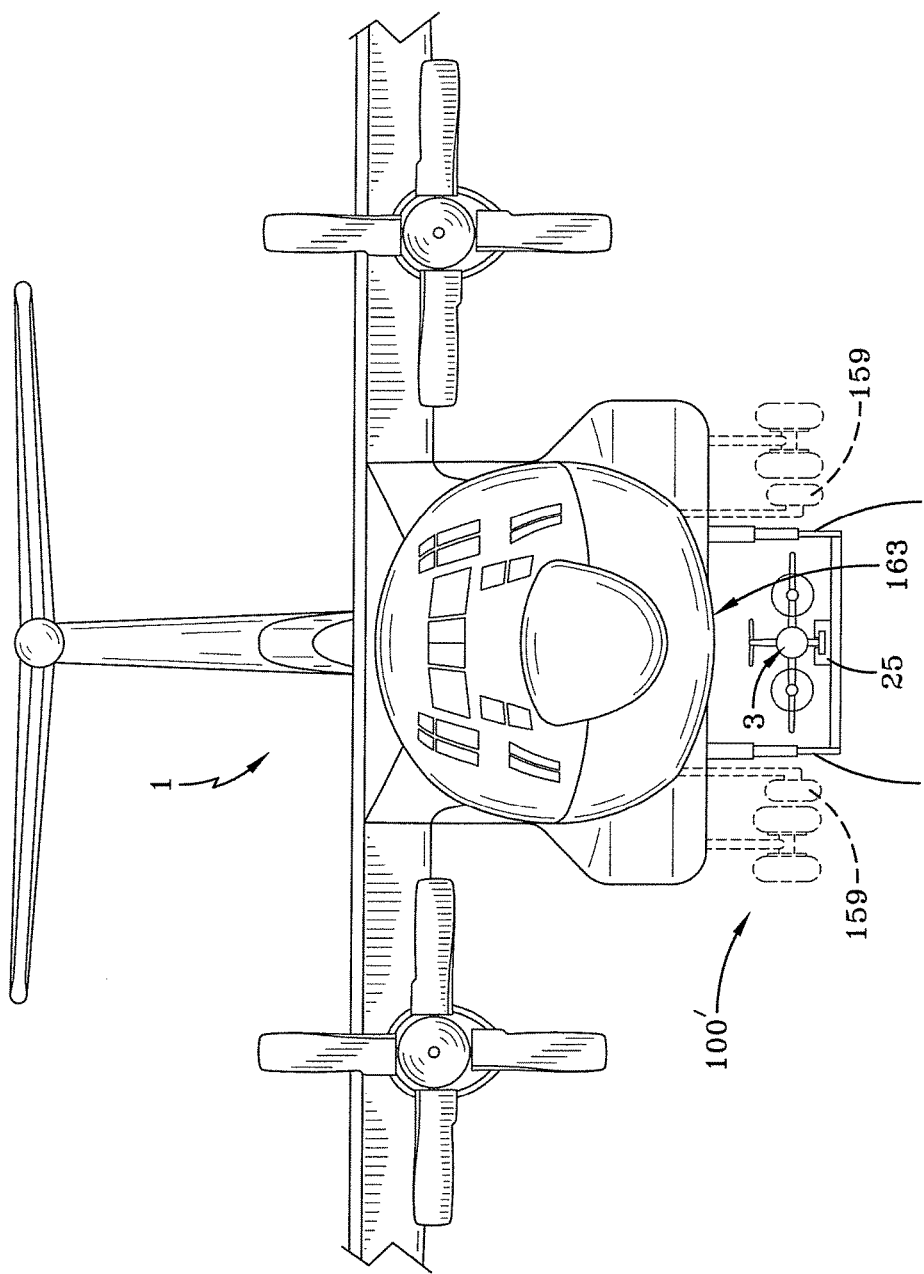

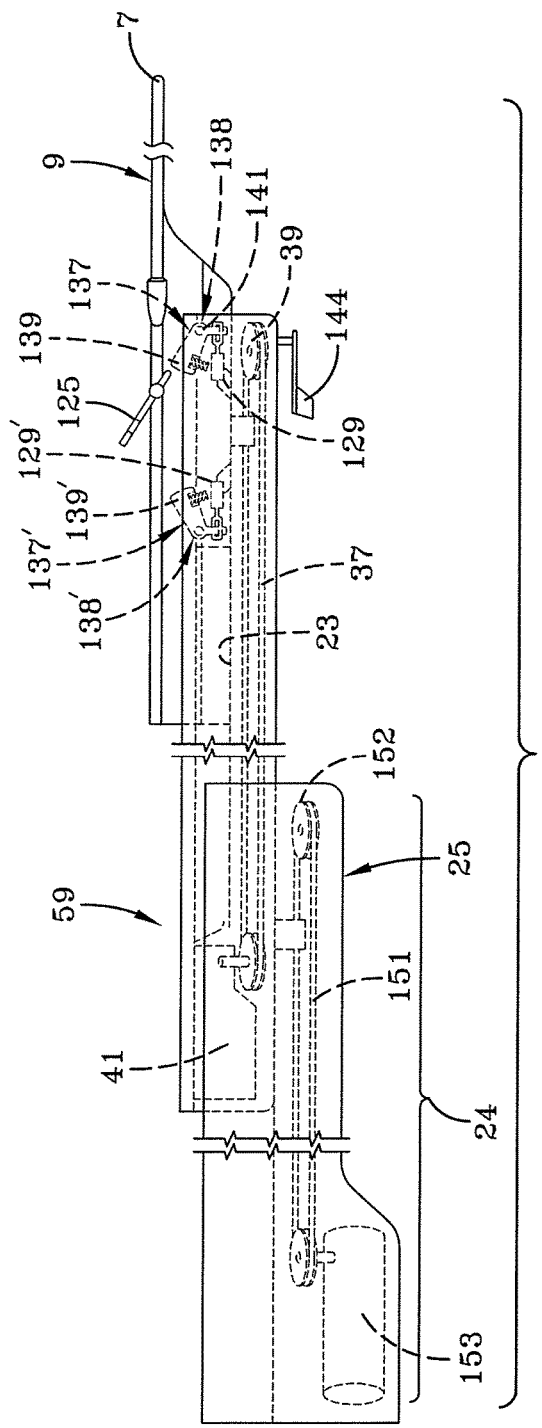
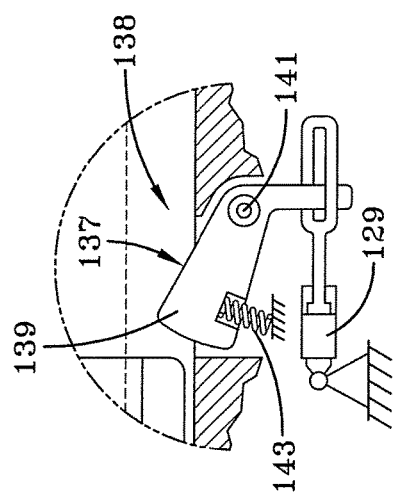

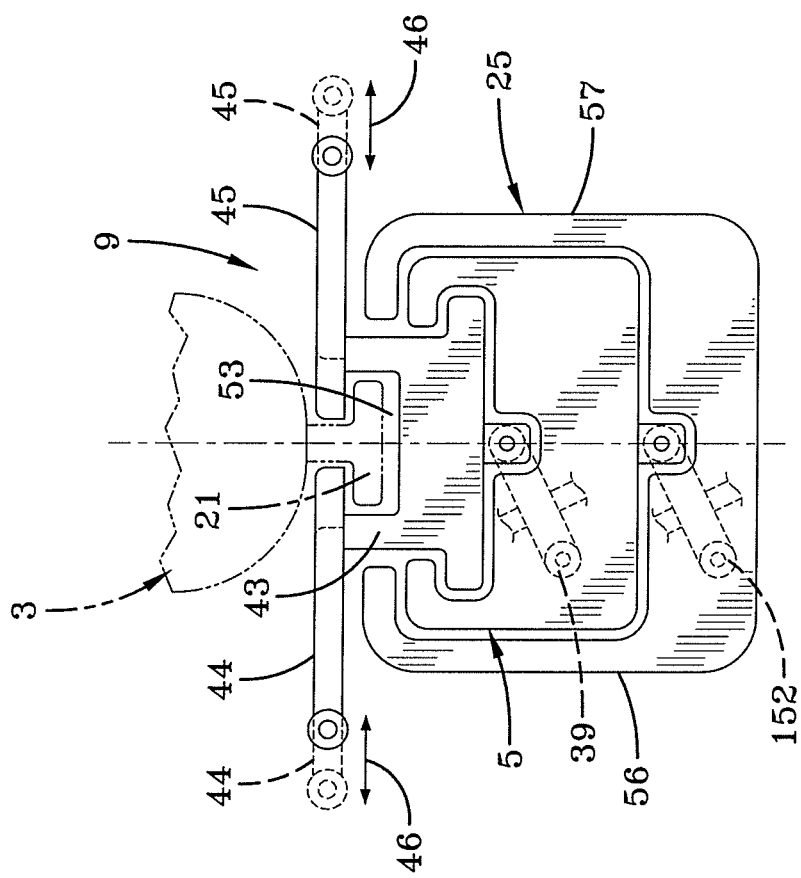

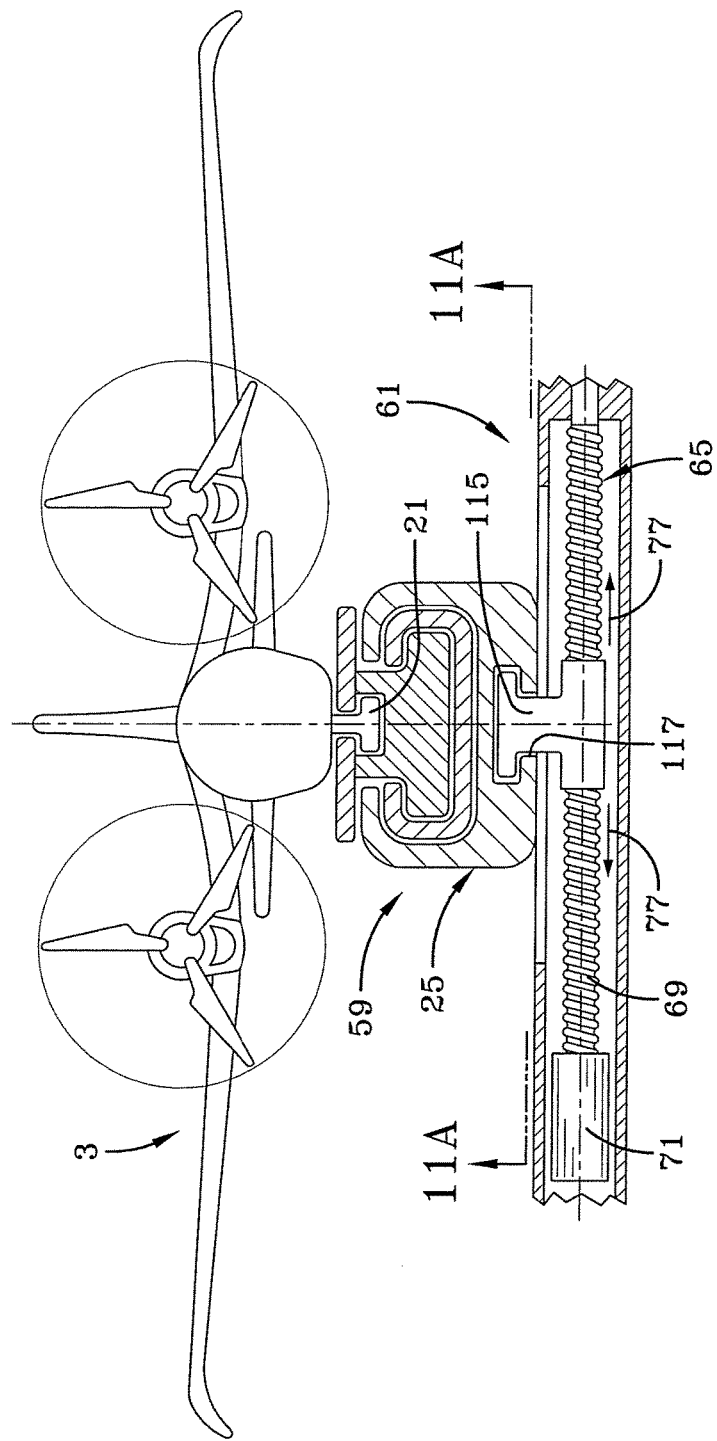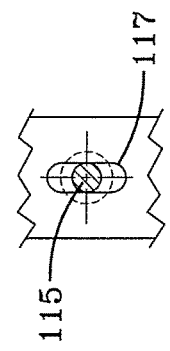

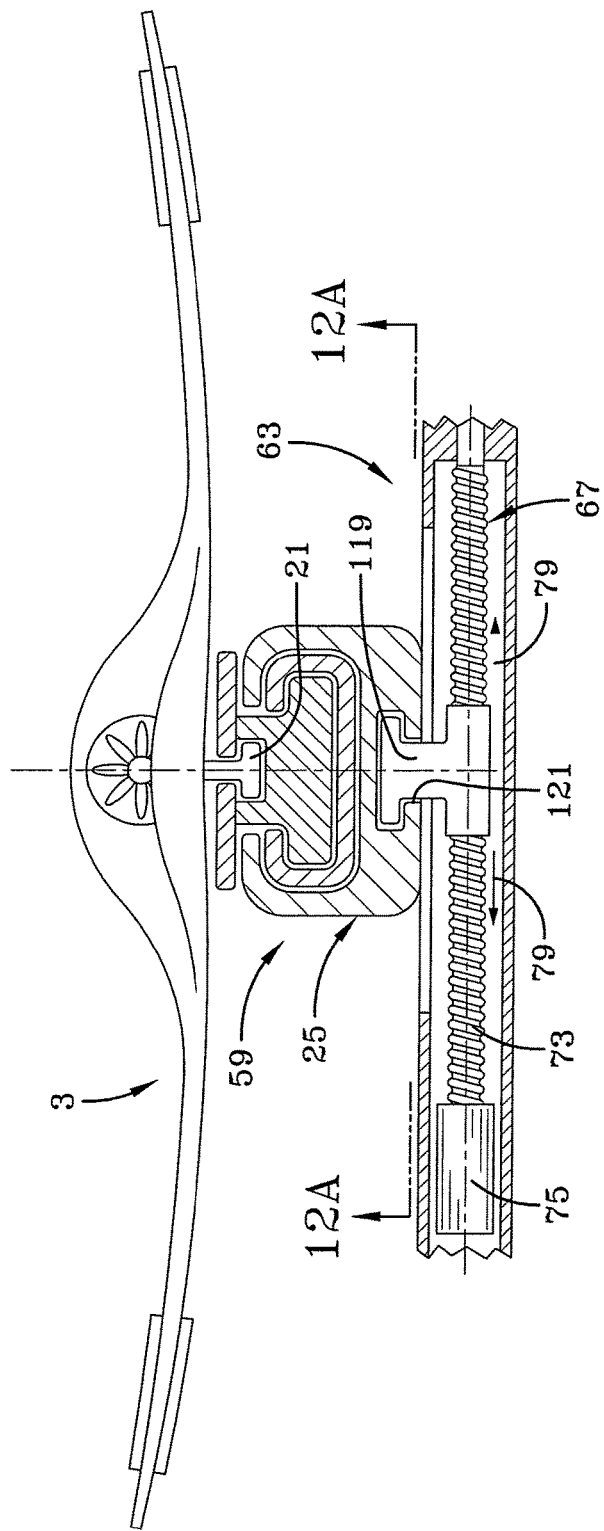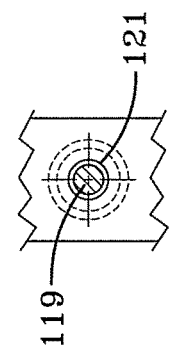

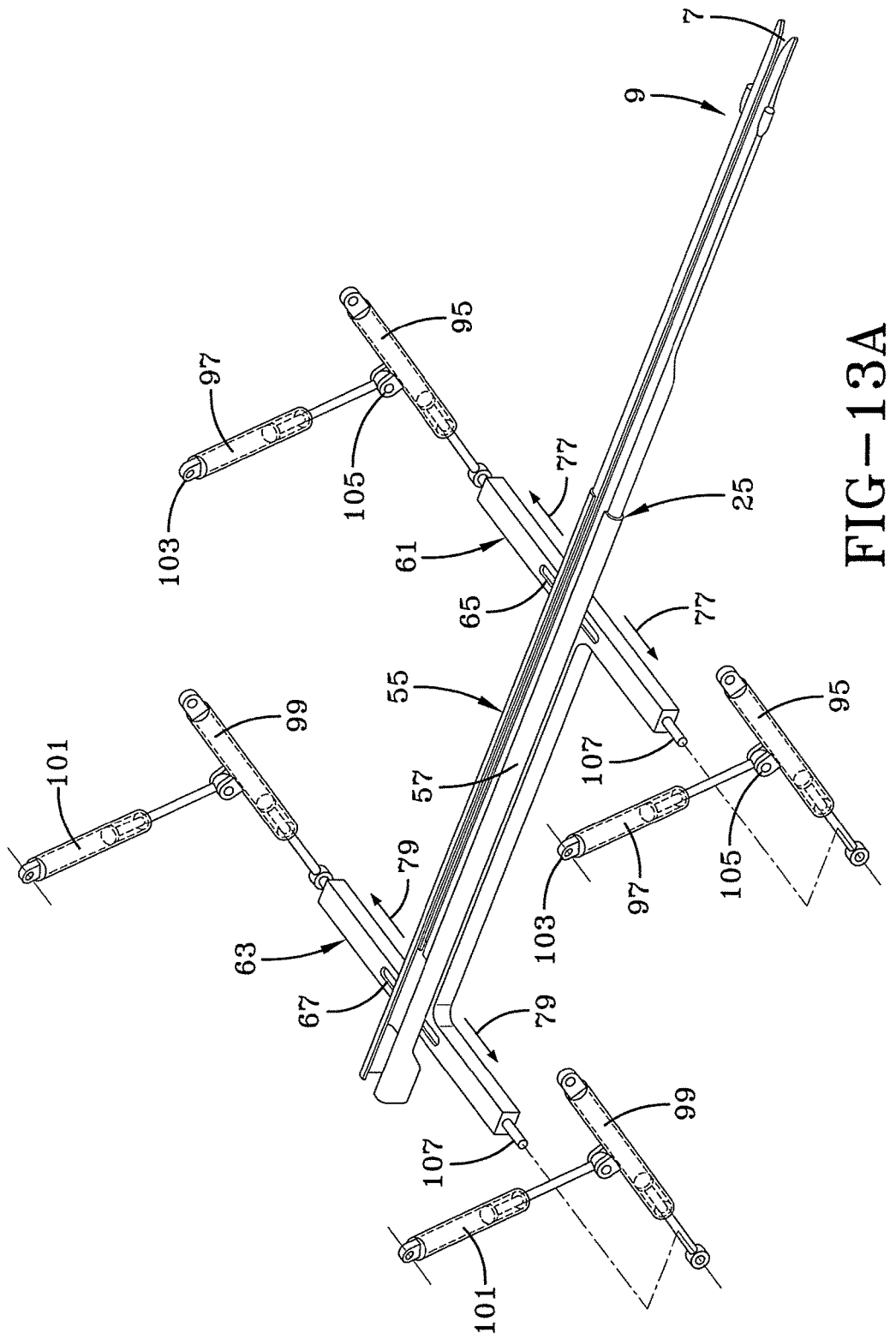

AIRBORNE DRONE LAUNCH AND RECOVERY APPARATUS

CROSS-REFERENCE TO RELATED APPLICATION

This application claims priority to U.S. Provisional Patent Application No. 62/172,447 filed Jun. 8, 2015, which is incorporated herein by reference in its entirety.

BACKGROUND OF THE INVENTION

Field of the Invention

This invention relates to an airborne drone launch apparatus for launching and recovering unmanned aircraft or drones, and in particular to apparatus for launching drones from aircraft and for using the apparatus for recovering drones subsequent flights of the drones.

Description of the Prior Art

Launching and retrieving small manned aircraft from an aircraft has been tried many times in the past, mostly unsuccessfully. Later, aircraft configured to do this became obsolete as jet engines became more fuel efficient while providing far more thrust, thus eliminating the need for short range protective fighter aircraft to be carried. These attempts depended on the smaller aircraft primarily used a hook type means to attach to the parent or carrier aircraft. A prime example of this is the "parasite aircraft" called the Goblin. The hook of the "parasite aircraft" engages a trapeze suspended under the parent aircraft, and is then retracted into the belly of the carrier aircraft, hereafter called the carrier or carrier aircraft.

Other systems used complex unfolding and extending frames to launch and retrieve the smaller aircraft. These attempted to launch the smaller airplane as far as possible from the carrier, outside the turbulent air around the parent. The Goblin failed exactly because of this turbulence, where it was extremely difficult to align the hook with the bar of the "trapeze" while flying in the turbulent slipstream and prop wash of the carrier aircraft. The pilot was nearly killed in the attempt to reattach to the carrier when the Goblin impacted the trapeze bar as it (the Goblin) bobbed up and down in the turbulent airflow below the carrier. Larger aircraft were launched and retrieved primarily under the carrier's center of lift because, to do otherwise would cause the carrier to become unbalanced, perhaps outside of its safe limit on center of lift movement.

Other methods, for lighter than airships the larger ones could actually have slow aircraft take off and land on its upper surface, while others utilized the trapeze method to launch and recover aircraft underneath. Some examples of carrier aircraft for launching and recovering manned aircraft are the following U.S. Airforce aircraft: F84E carried underneath a bomber, XF84 carried underneath a bomber, F84 underneath B50 bomber and Arado E381 carried by the Ar234.

BRIEF SUMMARY OF THE INVENTION

It is an object of the present invention to provide an improved apparatus for launching and recovering unmanned air vehicles, remotely piloted aircraft or drones with engines to propel the unmanned air vehicles, remotely powered aircraft or drones through the atmosphere (hereinafter "drones") from carrier aircraft.

Another object of the present invention is the provision of apparatus for launching and recovering drones from underneath carrier aircrafts.

It is also an object of the present invention to provide apparatus for launching and recovering drones having extensible components for facilitating the launching and safely capturing drones in flight.

A further object of the present invention is the provision of a drone launching and recovering system wherein drones are launched and recovered from beneath a carrier aircraft.

It is still a further object of the present invention to provide apparatus for launching and recovering drones from a carrier aircraft capable of holding and recovering a series of drones.

It is yet an additional object of the present invention to provide apparatus for launching and recovering drones using apparatus wherein the portion of the apparatus for engaging the drones does so in non-turbulent air ahead of the carrier aircraft.

An additional object of the present invention is the provision of a drone launching and recovery apparatus including conveying means for quickly and precisely moving drones either from storage to a launch position, or from flight to a storage location.

A still further object of the present invention is the provision of apparatus for launching and recovering drones having structure which can be readily installed on carrier aircraft.

A general object of the present invention is the provision of apparatus for launching and recovering drones which is safe, efficient and effective in manufacture and in use. These and other objects may occur to those skilled in the art from the application to follow and from the appended claims.

BRIEF DESCRIPTION OF THE DRAWINGS

The present invention may take physical forms in certain parts and arrangements of parts, the preferred embodiments of which will be described in detail in the specification and illustrated in the accompanying drawings which form a part hereof, and wherein:

FIG. 1 is a schematic plan view of a manta ray shaped carrier aircraft carrying an airborne drone launch and recovery apparatus as shown in FIG. 1, with a drone shown ahead of the airborne drone launch and recovery apparatus.

FIG. 2 is a schematic side view of an airborne drone launch and recovery apparatus mounted on the underside of a carrier aircraft and shown lowered in the extended position according to a preferred embodiment of the invention.

FIG. 3 is a schematic plan view of a stinger having extending therefrom a catcher shuttle according to a preferred embodiment of the invention, and FIG. 3A is a side view of the product shown in FIG. 3.

FIG. 6 is a partial, schematic perspective view of a stinger sliding within a stinger sheath which is in turn attached to a transverse linear drive assembly according to a preferred embodiment of the invention.

FIG. 7 is a schematic front view of a traditional aircraft such as a C-130 used as a carrier aircraft having an airborne drone launch and recovery apparatus extending below it according to a preferred embodiment of the invention.

FIG. 8 is a schematic side view of a stinger holding a catcher shuttle and extending from a stinger sheath, with interior components shown in dotted lines, according to a preferred embodiment of the invention, and FIG. 8A is an enlarged detail of an interior component shown in FIG. 8.

FIG. 9 is a partial, schematic front view of a stinger sheath in which is disposed a stinger holding a catcher shuttle with a drone being launched or recovered according to a preferred embodiment of the invention.

FIG. 11 is a schematic, partial cross section of a drone being launched or recovered by a catcher shuttle on a stinger mounted on a forward transverse linear drive system shown in FIG. 10, and 11A is an enlarged detail from FIG. 11.

FIG. 12 is a schematic, partial cross section of a catcher shuttle on a stinger mounted on a rearward transverse linear drive assembly shown in FIG. 10 with a drone being launched or recovered, and FIG. 12A is an enlarged detail from FIG. 12.

FIG. 13A is an exploded view of the alternative airborne drone launcher and recovery apparatus as shown in FIG. 13.

DETAILED DESCRIPTION OF THE PREFERRED EMBODIMENTS

Figure 4:
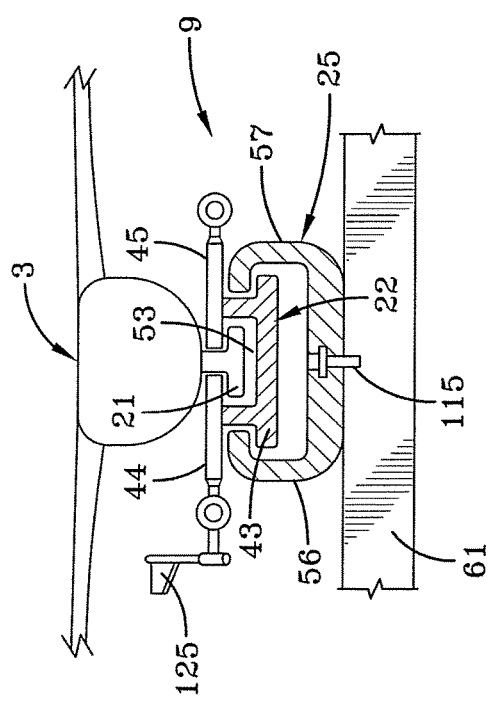
FIG. 4 is a partial, schematic front view of a drone being launched or recovered in apparatus according to a preferred embodiment of the invention.

Referring first to FIG. 1, a carrier aircraft 1 is shown. Carrier aircraft 1 includes apparatus 100 for launching and recovering one or more drones 3 while carrier aircraft 1 is in flight. The primary operative part of the invention is an extensible stinger 5 which is part of a stinger assembly 59 as explained below, and has mounted thereon catcher shuttle 9. Catcher shuttle 9 includes an open-ended, forward vee tip 7. Referring to FIG. 3, extensible stinger 5 is shown in this plan view, and catcher shuttle 9 mounted on stinger 5 has two elongated longitudinal, laterally disposed catcher shuttle members 11, 12 having outwardly inclined forward members 13 and 15 defining forward vee tip 7. Vee tip 7 is shown not only in FIG. 3, but also in FIGS. 1, 2, 5, 8, 10 and 10A.

FIG. 2 shows carrier aircraft 1 as being somewhat shaped like a "manta ray" structure in which extensible stinger 5, which is extensible by a relatively long distance L of between fifteen and thirty feet from a stinger sheath 25, is disposed in a spaced relation from the underside of carrier aircraft 1. Open ended vee tip 7 is mounted on catcher shuttle 9 as noted above. Catcher shuttle 9 has a wide forward part 19 (FIG. 3) which engages a recovery guide 21 (FIGS. 2, 4, 5, 9, 11-13) located on the bottom of drone 3.

As mentioned above, extensible stinger 5 extends some distance ahead of carrier aircraft 1 as shown in FIGS. 1 and 2, and therefore forward vee tip 7 of catcher shuttle 9 is located in undisturbed non-turbulent air. The undisturbed air permits drone 3 to be launched and recovered in non-turbulent air ahead of carrier aircraft 1, the body of which is surrounded by turbulent air which is caused by the passage of carrier aircraft 1 through the air and with high speed jet exhaust or prop wash.

Stinger 5 includes within its structure, a first linear drive 23 which is shown in FIGS. 3 and 8. First linear drive 23 is attached to catcher shuttle 9 whose vee tip 7 faces forward into the airstream for enabling the controlled movement of catcher shuttle 9 along nearly the full length from end to end of extensible stinger 5.

Stinger 5 and catcher shuttle 9 are partially enveloped in long stinger sheath 25 as shown, for example, in FIGS. 1, 2, 5, 6 and 8. FIG. 6 does not include catcher shuttle 9. Extensible stinger 5 is shown in detail in FIGS. 3 and 5. FIG. 3 is a plan view as indicated earlier, and as also explained above has at its forward end outwardly inclined forward members or catcher shuttle arms 13 and 15. Catcher shuttle arms 13 and 15 are slanted outwardly to form a slot, trough or opening 27. Slot 27 forms a narrow linear opening as it proceeds rearwardly in catcher shuttle 9. A pair of forwardly facing cameras 29 and 31 to enable binocular forward vision are mounted on opposite sides of catcher shuttle 9 distal from opening 27 at the beginning of flat sides 33 and 35 of catcher shuttle 9. First linear drive 23 is preferably a drive chain or drive belt 37, which is driven around an idler 39 by a drive motor 41 as shown in FIG. 8.

Catcher shuttle 9 has at its uppermost portion the pair of opposing, laterally movable catcher shuttle arms 13 and 15 mentioned above. Referring to FIGS. 4 and 9, each drone 3 has on its underside a recovery guide 21 which in the preferred embodiment, forms in cross section, an inverted T. Recovery guide 21 can take many forms, and is operatively engageable by catcher shuttle 9 to contribute to the launching and/or recovery of drone 3. Catcher shuttle 9 includes a launch/recovery assembly 22 for cooperating with recovery guide 21 to launch and recover drones 3. Launch/recovery assembly 22 is part of catcher shuttle 9 and in the preferred embodiment includes a support 43, for supporting arms 44 and 45, defining a recess 53. When recovery guide 21 is disposed in a recess 53 of launch/recovery assembly 22, and arms 44 and 45 of launch/recovery assembly 22, which arms 44, 45 are movable between open and closed positions shown by arrows 46 (FIG. 9), are in their closed positions, drone 3 cannot be moved in the vertical direction to be free from launch/recovery assembly 22.

Figure 10:
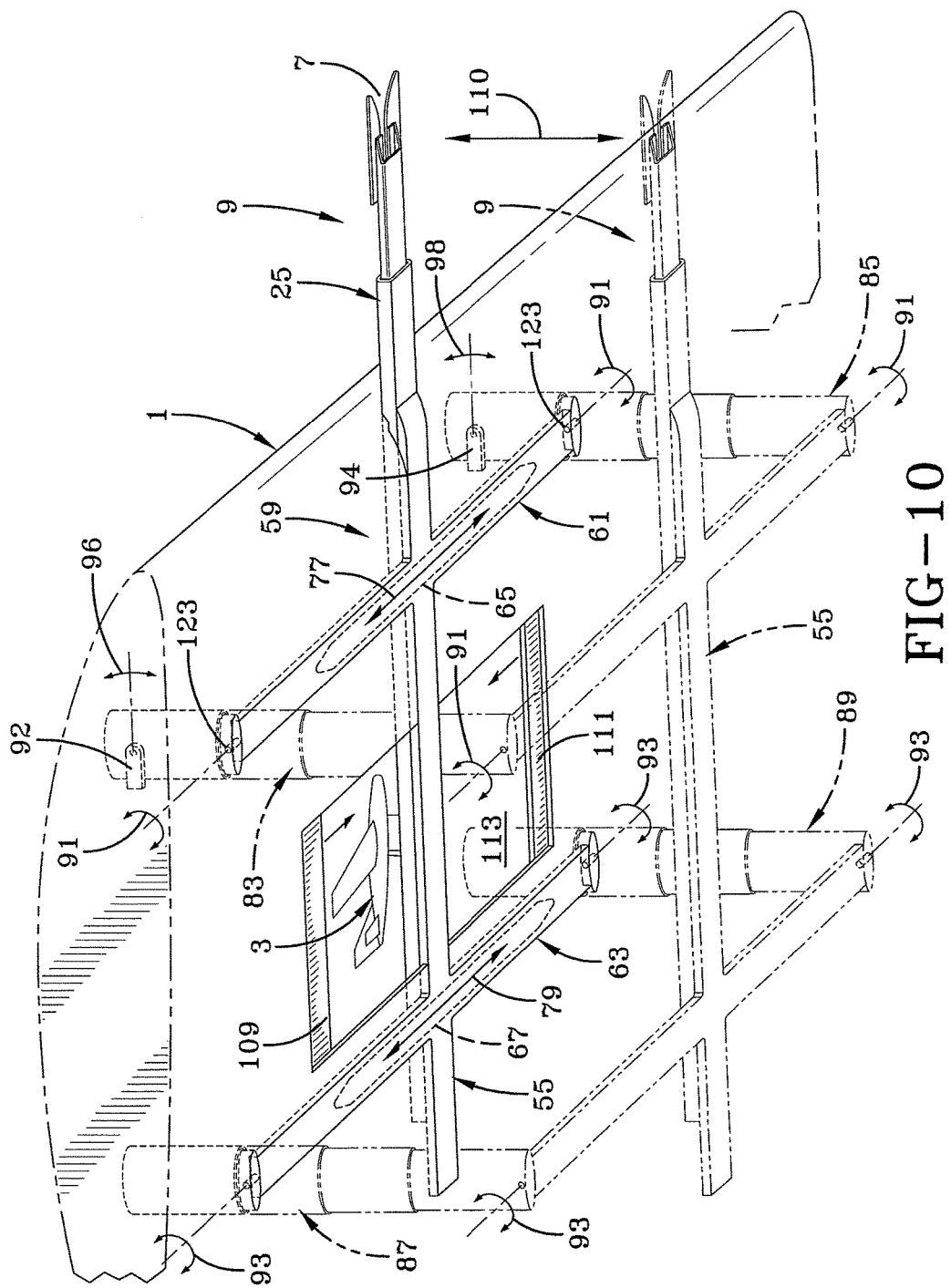
FIG. 10 is a schematic partial perspective view of a portion of the airborne drone launch and recovery apparatus forming part of a carrier aircraft, with some interior components and drones shown in dotted lines, according to a preferred embodiment of the invention.
Figure 10A:
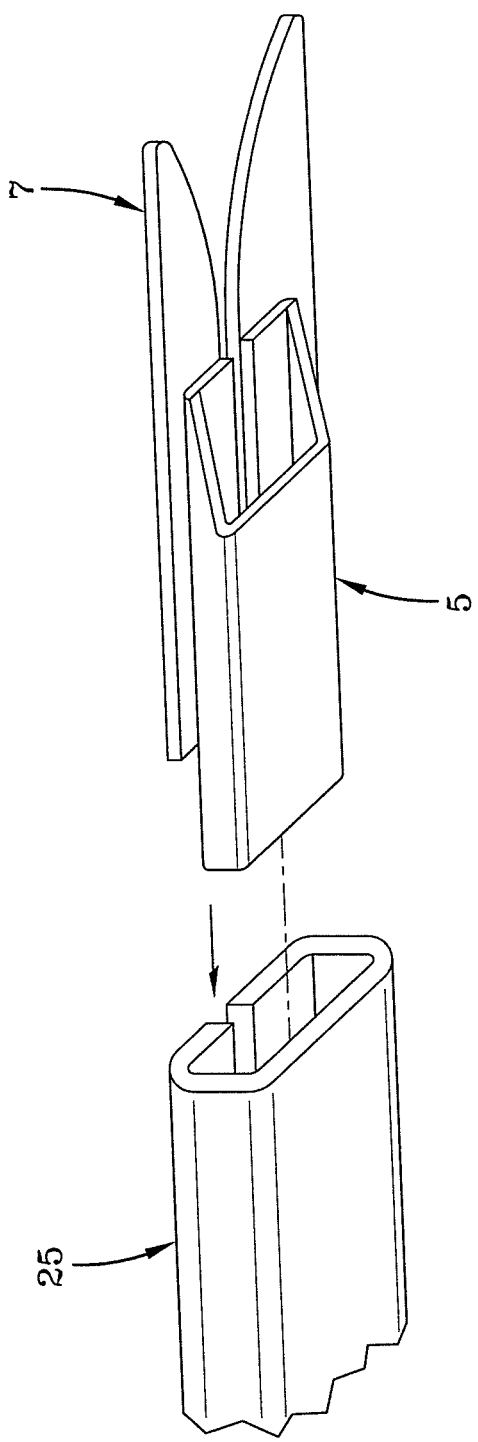
FIG. 10A is a detailed, schematic, partial perspective view of a catcher shuttle, stinger and stinger sheath shown in FIG. 10.

Stinger 5 is held in stinger sheath 25. Stinger sheath 25 is an elongated member having opposing lateral sides 56 and 57 shown most clearly in FIGS. 4, 6 and 9. Stinger sheath sides 56 and 57 engage opposing sides of stinger 5 to enable the longitudinal sliding movement of stinger 5 within stinger sheath 25. Stinger 5 and stinger sheath 25 are part of stinger assembly 59 explained above. Stinger assembly 59 includes a forward cross support 61 and a rearward cross support 63 illustrated in FIG. 10 joined together by a longitudinal support member 55 to form an "H" shaped straight line. Forward cross support 61 has a forward transverse linear drive assembly 65 (FIGS. 10, 11), and rearward cross support 63 has a rearward transverse linear drive assembly 67 (FIGS. 10, 12). Forward transverse linear drive assembly 65 includes a screw drive 69 which is driven by an actuator 71 as shown in FIG. 11. Likewise, rearward transverse linear drive assembly 67 includes a screw drive 73 which is rotated by an actuator 75 depicted in FIG. 12. Stinger assembly 59 is moved in the lateral directions as indicated by arrows 77 under the control of forward transverse linear drive assembly 65 and rearward transverse linear drive assembly 67 of stinger assembly 59, and as shown by arrows 79 with respect to rearward transverse linear drive assembly 67.

When drone launcher and recovery apparatus 100 is not in use, stinger assembly 59 is held close to the underside of carrier aircraft 1 or may be contained within carrier aircraft 1's structure in retracted position shown in FIG. 10. When stinger assembly 59 is in use for either launching drones 3 or recovering drones 3, stinger assembly 59 is lowered from the bottom of carrier aircraft 1. One embodiment for doing this is shown in FIG. 10. A pair of front extendable arms 83 and 85 are attached to the opposite ends of forward cross support 61. Likewise, rear extendable arms 87 and 89 are attached to the opposite ends of rearward cross support 63. Extendable arms 83, 85, 87 and 89 could be hydraulically driven telescoping arms as shown. Extendable arms 83, 85 are used to raise or lower stinger assembly 59. Stinger 5 with catcher shuttle 9 is permitted to be angled upwards or downwards or angled up or down to match the angle of attack of drone 3. Tilting apparatus is employed to tilt longitudinal support member 55 and stinger sheath 25 to properly orient catcher shuttle 9 to receive drone 3 from controlled flight or to launch drone 3 into the atmosphere. Hinges 92 and 94 fixed to carrier aircraft 1 are connected respectively to the upper parts of extendable arms 83 and 85. Hinges 92 and 94 pivot the upper parts of extendable arms 83 and 85 in the directions shown by arrows 96 and 98. Extendable arms 87 and 89 do not pivot. When extendable arms 83 and 85 pivot clockwise with their respective lower portions moving towards extendable arms 87 and 89, longitudinal support member 55, stinger sheath 25 and stinger 5 are pivoted counter clockwise about the bases of respective extendable arms 87 and 89, to angle upward or downward catcher shuttle 9. The amount that catcher shuttle 9 is raised or lowered increases the ability of catcher shuttle 9 to be in the correct angular position for receiving drone 3 from controlled flight or to launch drone 3 into the undisturbed air ahead of carrier aircraft 1. The vertical movement of longitudinal support member 55, stinger sheath 25 and stinger 5 is indicated by arrow 110.

Figure 13:
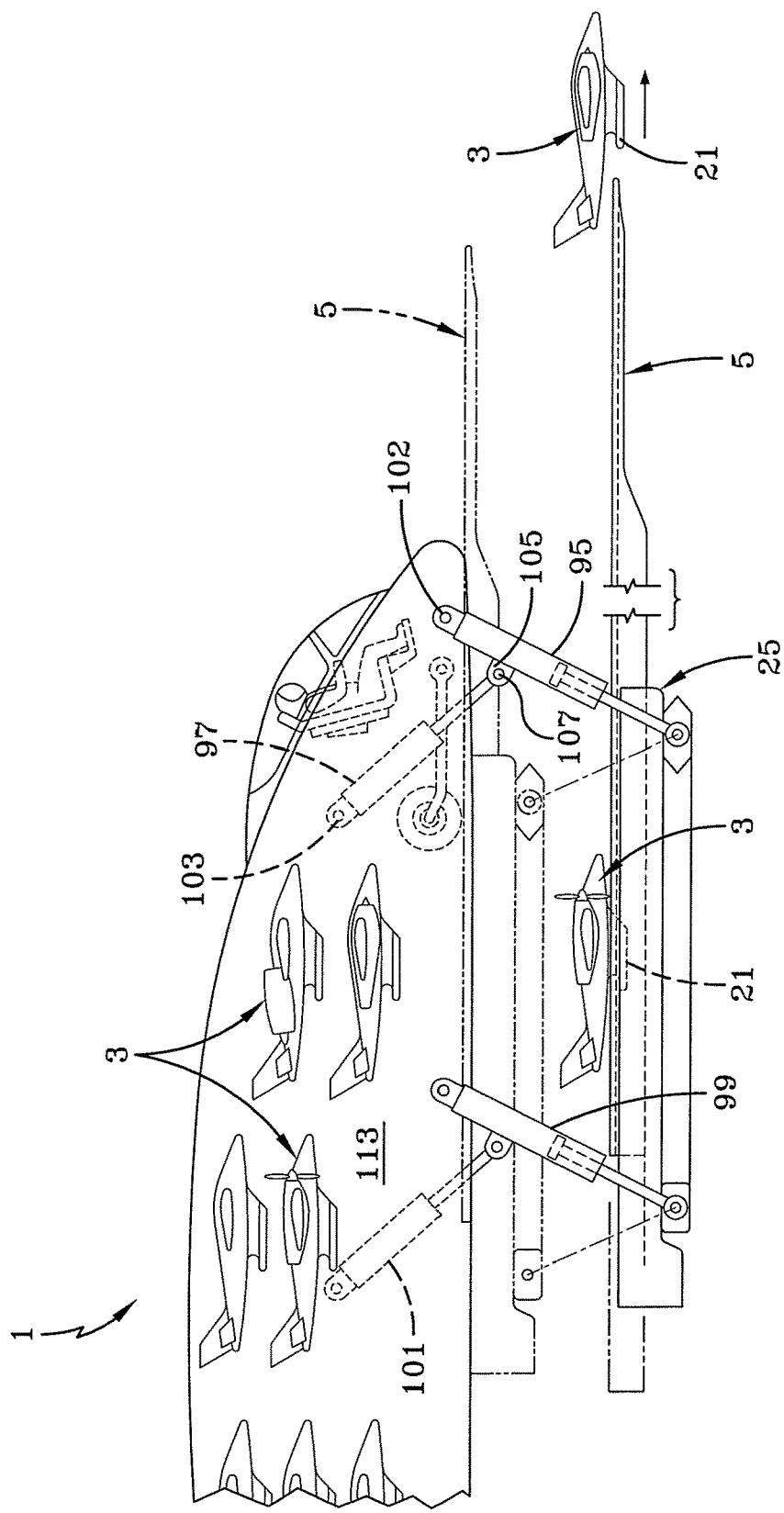
FIG. 13 is a schematic, partial perspective view of a carrier aircraft having an alternative to the embodiment shown in FIG. 10, with a drone being launched.

An alternative to extendable arms 83, 85, 87 and 89 is shown in FIG. 13. In FIG. 13, there is illustrated front pivoting arms 95 and 97, and rear pivoting arm 99 and 101. Front pivoting arms 95 and 97 have upper connection portions 101 and 103 which are attached to carrier aircraft 1 on opposite side portions of carrier 1. Front pivoting arm 95 has a connection portion 105 which has an orifice for receiving a cylindrical connection member 107 extending from forward cross support 61. The remaining pivoting arms are all connected to the respective cross pieces in the same manner.

Figure 5:
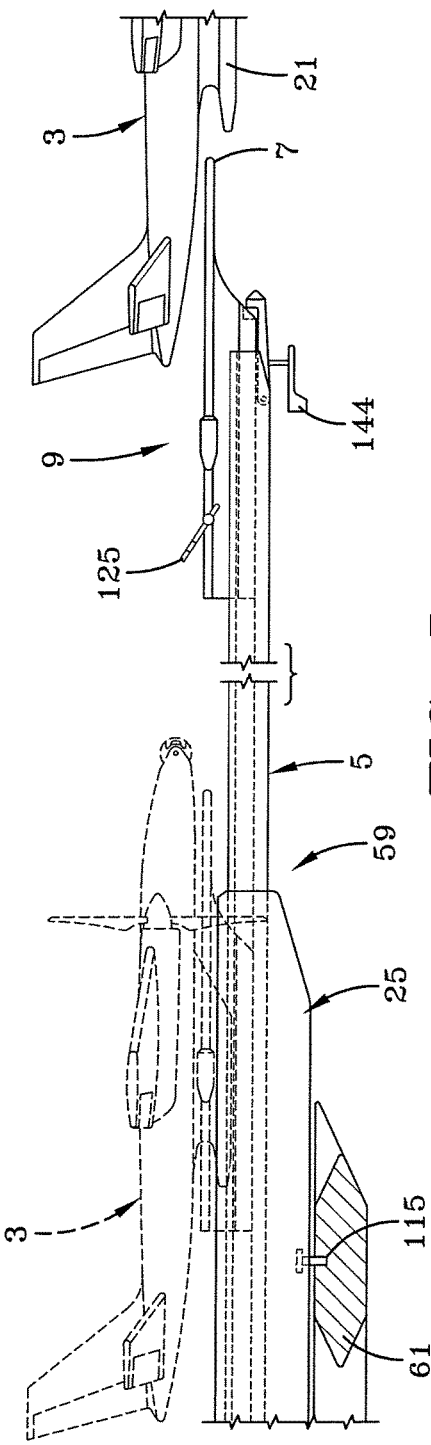
FIG. 5 is a partial, schematic side view of a stinger extended from a stinger sheath on the underside of a carrier aircraft with a drone being launched or recovered according to a preferred embodiment of the invention.

Drones 3 are preferably stored in an interior or hull or bay 113 of carrier aircraft 1 as indicated in FIGS. 10 and 13. A pair of bay doors 109 and 111 open and close bay 113 from which drones 3 can be withdrawn from or moved to their storage space in carrier aircraft 1. When one of drones 3 is to be launched, bay doors 109 and 111 are moved to their open position as shown in FIG. 10, and vee tip 7 of catcher shuttle 9 is moved into recess 53 of catcher shuttle 9 after catcher arms 44 and 45 are moved to their open positions as shown in dotted lines in FIG. 9. After recovery guide 21 of drone 3 is moved into recess 53, catcher arms 44 and 45 are moved to their closed position to retain drone 3 on catcher shuttle 9 and held longitudinally by pivoting members 137, 139. Stinger assembly 59 is initially located adjacent the underside of carrier 1. Either extendable arms 83, 85, 87 and 89 (or pivoting arms 95, 97, 99 and 101) move stinger assembly 59 to the active position as shown in FIG. 2. Drone 3 is thus located in rearmost portion of slot 27 of catcher shuttle 9 between elongated, longitudinal, laterally disposed catcher shuttle members 11 and 12. A second linear drive 24, discussed hereinafter, then extends the stinger 5 until the tip of the stinger 5 is clear of the turbulent air surrounding the carrier aircraft 1. First linear drive 23 moves catcher shuttle 9 forwardly along with drone 3 located thereon to the forward end of stinger 5 out of the turbulent air surrounding carrier aircraft 1 and into the undisturbed air ahead of carrier aircraft 1. Drone 3 is then launched as shown in FIG. 5.

Returning to FIG. 11, forward cross support 61 includes a pin 115 shown in FIG. 11A which extends through a short longitudinal slot 117 connected to stinger sheath 25, which lies along the longitudinal axis of stinger sheath 25 to permit it to be angled laterally as required by the airflow. Referring to FIG. 12, rearward transverse linear drive assembly 67 in connected to stinger sheath 25 by means of a rear pin 119 shown in FIG. 12A which is then constrained within a circular hole 121 so that stinger sheath 25 pivots around pin 119.

Referring to FIG. 10, front extendable arms 83 and 85 are attached to coaxial pins 123. The axis of pins 123 is perpendicular to the longitudinal axis of carrier aircraft 1, and the opposite ends of pins 123 (only coaxial pin 123 of arm 83 is visible) are connected to forward cross support 61. Rearward cross support 63 has similar pins which are connected to rear extendable arms 87 and 89, and rearward cross support 63 in the same manner. Arms 87 and 89 always extend equally. Similarly, arms 83 and 85 also extend equally, but may extend differentially to rearward arms 87 and 89 as needed to launch or recover drone 3. As explained previously, stinger sheath 25 can be extended downwardly to an operative location, and stinger 5 is partially extended out of stinger sheath 25, with catcher shuttle 9 and its vee tip 7 at zero angle of attack in the undisturbed air ahead of carrier aircraft 1, by extending partially both the front extendable arms 83 and 85, and operating forward transverse linear drive assembly 65 and rearward transverse linear drive assembly 67. The orientation and position of vee tip 7 can then be adjusted to recover a drone 3 by changing the lengths of respective front extendable arms 83, 85 and rear extendable arms 87, 89.

Reference is now made to FIG. 8. An angle of attack sensor 125, and a yaw sensor 144 only senses the airflow at the end of stinger 5 to enable catcher shuttle 9 and launch/recovery assembly 22 to be positioned to better engage recovery guide 21 of drone 3. Spring loaded latching assembly 137 and 137' within catcher shuttle 9 captures and hold retrieval guide 21 of drone 3. Spring loaded latching assembly 137 is discussed below. Spring loaded latching assembly 137 includes a pivoting member 138. Pivoting member 138 has a downwardly extending (as shown in FIG. 8) and an inwardly extending latching arm 139 integral with downwardly extending arm 139. Pivoting member 138 is mounted about a pivot 141, and is biased in a clockwise direction by a spring 143. A similar pivoting assembly 137' having like components is provided inwardly under catcher shuttle 9 but facing outwardly towards pivoting member 137 and having a similar function as pivoting assembly 137. Pivoting assembly 137' has components corresponding to those of pivoting assembly 137 and given the same identifying numbers but with a prime (') suffix. Latching assemblies 137 and 137' are used to hold a drone 3 atop catcher shuttle 9 to either move a drone 3 from storage to a launch position, or to move a captured drone from catcher shuttle 9 to storage such as in the bay of a carrier aircraft 1.

When drone 3 is to be engaged or captured by launch/recovery assembly 22 of catcher shuttle 9, stinger 5 with catcher shuttle 9 moved to near the free end of stinger 5 extends out to engage recovery guide 21 of drone 3. The vertical stem of recovery guide 21 will then slide between catcher arms 44 and 45 and the horizontal part of recovery guide 21 will be trapped securely by two inwardly facing latching arms 139 and 139' which are spring loaded by springs 143. When drone 3 is securely attached to the top of catcher shuttle 9, drone 3 can be moved to a location below bay 113 through the turbulent air surrounding carrier aircraft 1.

If drone 3 is to be launched aft, after lowering drone 3 out of bay 113 to an optimal attitude with regards to the slipstream, recovery guide 21 is initially securely held between latching arms 139' and 139, a retract hydraulic cylinder 129' then lowers arm 139' and catcher shuttle 9 travels rapidly forwardly along stinger 5 to eject drone 3 from catcher shuttle 9.

Normally, if drone 3 is to be launched forward, stinger 5 with the catcher shuttle 9 with captive drone 3 on top held captive between latching arms 139 and 139' is lowered out of the bay 113 to an optimal attitude with the slipstream, then stinger 5 is extended out of the turbulent air around carrier aircraft 1, and catcher shuttle 9 is rapidly driven to the forward end of stinger 5. Just before catcher shuttle 9 reaches the forward end, retract cylinder 129 retracts latching arm 139 and releases drone 3 into free flight.

Yaw sensor 144 is included on stinger 5 for measuring the angular velocity of respective drones 3 to be used as part of the launching and recovery procedures. Thus, feedback from angle of attack sensor 125 and yaw sensor 144 enables stinger 5 to be oriented into the flight path of carrier aircraft 1 for optimal launching and recovery of drones 3.

Also disposed on catcher shuttle 9 are frontwardly facing cameras 29 and 31 mentioned above, which are on both sides of vee tip 7 to enable binocular vision and enable depth perception of drone 3 when drone 3 is flying ahead of carrier aircraft 1 under the control of carrier aircraft 1. The latter enables the measurement of the separation between vee tip 7 and the drone 3, since this can be detected prior to stinger 5 extending further to engage drone 3 by recovery guide 21. That is, stinger 5 can engage drone 3 by recovery guide 21 of drone 3, with vee tip 7 of catcher shuttle 9 when catcher shuttle 9 is at the end of its forward travel on stinger 5.

In order to launch one of drones 3, stinger 5 is held against or within the bottom of carrier aircraft 1, and recovery guide 21 of drone 3 is placed within slot 27 while drone 3 is within the hull of carrier aircraft 1 (drones 3 located in carrier aircraft 1 will be referred to as "stored drones 3," and in singular as "a stored drone 3"). A stored drone 3 is held in position on catcher shuttle 9 by spring loaded assemblies 137 and 137' linear drive 23 and a second linear drive 24 as shown in FIG. 8. The position and velocity of catcher shuttle 9 is controlled by means of first linear drive 23 within stinger 5 which is actuated by means of actuator motor 41. Second linear drive 24 includes a drive chain or drive belt 151 which is controlled by an actuator motor 153 for stinger 5, both of which are located within stinger sheath 25. Actuator motor 41 for catcher shuttle 9 preferably has an extension rate of a moderate one foot per second. However, the burst speed would be about two feet per second in order to recover a drone as discussed below.

As indicated above, in order to launch a stored drone 3, stinger 5 is located at the bottom of carrier aircraft 1, and recovery guide 21 of stored drone 3 is placed within slot 27 of catcher shuttle 9 while stored drone 3 is within the hull of carrier aircraft 1, and catcher shuttle 9 is held in position by first linear drive 23 within stinger 5 and second linear drive 24 within stinger sheath 25, as well as by forward transverse linear drive assembly 65 and rearward transverse linear drive assembly 67. Latching arms 139 and 139' serve as raised blockages and are located in front of and behind recovery guide 21 of a drone 3 being held within slot 27 of catcher shuttle 9.

Front and rear extendable arms 83, 85, 87 and 89 are used to lower stinger sheath 25, stinger 5 and catcher shuttle 9, along with stored drone 3. The engine of drone 3 is then started, and when the thrust provided by the engine of stored drone 3 overcomes the drag of the slipstream as might be measured by a force sensor in contact with the rear part of recovery' guide 21 of stored drone 3. The thrust of the engine of stored drone 3 is then further increased and first linear drive 23 of stinger 5 is used to accelerate drone 3 on catcher shuttle 9 forwardly to the end of the stinger 5, ejecting drone 3 from stinger 5 into free flight into non-turbulent air ahead of carrier aircraft 1 where drone 3 can accelerate away to perform its mission (drones 3 when in flight are referred to below as "launched drones 3" and in singular as a "launched drone 3").

Alternatively, the engine of stored drone 3 can be set idle, and blockage 157 at the rear of slot 27 of catcher shuttle 9 of stinger 5 can be retracted, and drone 3 can forcefully be ejected backwards out of the rear of slot 27 by any combination of drag forces and a combination of first linear drive 23 and second linear drive 24 (which could be an induction motor or other means), and then launched drone 3 is far enough away, launched drone 3 can accelerate away to perforin its mission. Tests should be performed to verify that this mode of launching drone 3 through the particular carrier aircraft 1's turbulence slipstream is feasible, as each body shape, velocity, angle of attack, etc. combination produces different patterns of turbulence which may direct launched drone 3 to impact against the body of carrier aircraft 1.

In order to recover a launched drone 3, launched drones 3 are directed to carrier aircraft 1 to fly to a proximate location relative to carrier aircraft 1. Particular launched drone 3 to be recovered is further directed and flown under the control of carrier aircraft 1, into a position in front of carrier aircraft 1 such that its recovery guide 21 is as closely as possible, directly in front of stinger 5 as viewed by cameras 29 and 31, which is substantially extended, and positional feedback is used to keep launched drone 3 on a stable flight path just prior to its recovery. Other launched drones 3 yet to be recovered are meanwhile positioned in a stable pattern or flock relative to carrier aircraft 1 through a feedback and control loop.

Stinger 5 can then be extended forward to engage recovery guide 21 using depth perceiving binocular vision cameras 29 and 31 on the forward end of catcher shuttle 9. Stinger 5 would then be adjusted by moving stinger 5 angularly and vertically up and down by use of extendable arms 83, 85, 87 and 89 and sideways by forward transverse linear drive assembly 65 and rearward transverse linear drive assembly 67 as appropriate.

Small alignment lights such as light emitting diodes (infrared lights may be used at night) may be placed on drone 3 to allow night operations together with other sensors, or drone 3 may be illuminated from carrier aircraft 1. The alignment lights would be seen by cameras 29 and 31 on tip of stinger 5, together with telemetry from launched drone 3, and they can be used to place launched drone 3 in proper alignment. When launched drone 3 is properly aligned to be received by the catcher shuttle 9 at the tip of stinger 5, stinger 5 is speedily extended further from stinger sheath 25 to engage recovery guide 21 of launched drone 3. When stored drone 3 (which was immediately previously launched drone 3) is securely engaged, drive motor 41 is used to activate first linear drive 23 to move stored drone 3 to the rear of stinger 5, and hold stored drone 3 stationary in such a position that when the end of forward members 13, 15 engaging support structure on stored drone 3 is raised towards the bottom of carrier aircraft 1, stored drone 3 is properly positioned to enter bay 113 after bay doors 109 and 111 are opened. This completes the retrieval process which, for the maximum possible rate to be achieved should be automated.

As a safety measure, if launched drone 3, for various reasons, is contacted by stinger 5 improperly and begins to angle upwards into the path of carrier aircraft 1, angle of attack sensors 125 on board launched drone 3 will s this and cause launched drone 3 to accelerate out of contact with stinger5 and re-stabilize the flight path of launched drone 3 relative to carrier aircraft 1 prior to another retrieval attempt.

FIG. 7 illustrates the use of a traditional carrier aircraft 1' for holding apparatus 100' for launching and recovering drones. Nose landing gear 159 have to be displaced to the side, so as not to obstruct the operations of the launch and recovery system of carrier aircraft 1'. The number of stored drones 3 may have to be limited to, say 20, if they are stacked four high with five stacks or to the storage space available within the carrier aircraft. Launch and recovery stingers 5 are shown extended. A roller shutter type door 163 can be used to pass drones in an out of the hull of carrier aircraft 1' which may be, transport aircraft such as the Airbus A400M, Alenia C-27, Boeing C-17, TADS CASA C-295, de Havilland Canada C-7, Kawasaki C-2, Lockheed C-130 or Short Skyvan.

In these aircraft which all have a rear ramp very rapid deployment of drones 3 by the same method as used for air dropped cargo, i.e. a drogue parachute attached to the rear of drone 3 is ejected and drags drone 3 out of the rear ramp, then the drogue parachute is discarded. A large transport aircraft such as a Boeing 747 freighter could store as many as 1,000 stored drones. As the technology of linear induction motors advances it may enable recovery guide 21 of launched drone 3 to be engaged by, and moved directly within the stinger 5 as shown in FIG. 12, where recovery guide 21 is the forcer, and stinger 5 that holds within it the platen of an induction motor, and electromagnetic forces move or hold the recovery guide anywhere along the length of stinger 5. When such an advance in the technology of linear induction motors occurs, catcher shuttle 9 maybe replaced by electromagnetic forces to position, accelerate, decelerate and capture launched drone 3 Obviating the need for many mechanical actuator systems used in the current preferred embodiment.

The invention has been described with particular reference to its preferred embodiments, but variations and modifications within the spirit and scope of the invention may occur to those skilled in the art to which the invention pertains.

The invention claimed is:

1. An airborne drone launch and recovery apparatus for use on a carrier aircraft for launching stored drones and for recovering launched drones, each drone including a recovery guide for cooperating with the carrier aircraft to enable the carrier aircraft to capture a launched drone, said airborne drone launch and recovery apparatus comprising:
   a stinger assembly for attachment to the underside of the carrier aircraft, said stinger assembly including:
      a stinger for disposition in a spaced relationship from the underside of the carrier aircraft; and
      a catcher shuttle held by said stinger for being disposed in the non-turbulent air in front of the turbulent air region produced by the carrier aircraft in flight, said catcher shuttle being both releasably engageable with the recovery guide of a launched drone to selectively release the recovery guide of a stored drone prior to launch of the stored drone, and engageable with the recovery guide of a launched drone to effect the engagement of the recovery guide upon the end of flight of the launched drone to capture the launched drone to terminate the flight of the launched drone.

2. The airborne drone launch and recovery apparatus according to claim 1 wherein said stinger is mountable at the underside of the carrier aircraft, and said catcher shuttle being extendable from said stinger into the non-turbulent air in front of the carrier aircraft during flight of the launched drone to selectively launch a stored drone in the non-turbulent air, or to recover a launched drone at the end of the flight of the launched drone from the non-turbulent air.

3. The airborne drone launch and recovery apparatus according to claim 2 wherein said catcher shuttle is extensible along said stinger into the non-turbulent air in front of the carrier aircraft, and said catcher shuttle includes a launch/recovery assembly for selectively operatively engaging the recovery guide of a launched drone in the non-turbulent air in front of the carrier aircraft at the end of a flight of the launched drone to selectively either capture the launched drone or
   for operatively engaging the recovery guide of a stored drone prior to the launching of the stored drone into flight in the non-turbulent air in front of the carrier aircraft and enable the launching of a stored drone into the non-turbulent air.

4. The airborne drone launch and recovery apparatus according to claim 3 wherein said launch/recovery assembly comprises a releasable locking device for alternatively having a closed condition for selectively receiving the recovery guide of a stored drone prior to the launch of the stored drone by said airborne drone launch and recovery apparatus, or for selectively, releasably locking the recovery guide of a launched drone following a flight of the launched drone to capture the launched drone, and an open condition for selectively releasing the recovery guide of a stored drone for enabling the launch of a stored drone from said carrier shuttle or for receiving the recovery guide of a launched drone at the end of a flight of the launched drone for subsequent locking the recovery guide both to terminate the flight of the launched drone and to recover the launched drone.

5. The airborne drone launch and recovery apparatus according to claim 4 wherein the recovery guide of a stored drone to be launched or a launched drone to be recovered includes a locking member extending from the bottom of said stored drone or said launched drone, and wherein said launch recovery/assembly comprises:
   walls defining a recess configured to receive the locking member of a recovery guide of said stored drone or said launched drone; and
   a door structure alternatively having a closed position for closing said recess in response to the reception of a locking member in said recess to put said launch/recovery assembly in the closed condition and releasably lock said drone to said launch recovery assembly, and an open position to enable the reception and withdrawal of the recovery guide recess from said recess to enable either the launching of a stored drone from the launch/recovery apparatus or the recovery of a launched drone by said launch/recovery apparatus.

6. The airborne drone launch and recovery apparatus according to claim 2 wherein said stinger assembly includes:
- a stinger sheath to be placed at the underside of the carrier aircraft, said stinger of said stinger assembly being disposed in said stinger sheath in a telescoping manner, with said stinger being slidable in said stinger sheath between a retracted position and a fully extended position wherein said catcher shuttle held by said stinger is located in the non-turbulent air; and
- a first drive located in said stinger and being operatively connected to said catcher shuttle, said first drive being actuable to move said catcher shuttle between a withdrawn position and an extended position, said catcher shuttle being enabled to effect selectively the launch of a stored drone and the recovery of a launched drone when said catcher shuttle is in the extended position.

7. The airborne drone launch and recovery apparatus according to claim 6, wherein said stinger sheath extends in the longitudinal direction relative to the carrier aircraft, and wherein said stinger assembly further comprises:
- a forward cross support comprising a forward transverse drive assembly operatively connected to said stinger sheath;
- a rearward cross support comprising a rearward transverse drive assembly operatively connected to said stinger sheath; and
- a longitudinal member joining said forward cross support and said rearward cross support;
- wherein said forward cross support and said rearward cross support can manipulate said stinger sheath and move said stinger sheath in a desired position for the launch of a stored drone in desired direction or to recover the launched drone following flight of the launched drone in any flight path within a range of said air launch and recovery direction.

8. The airborne drone launch and recovery apparatus according to claim 7, and further including:
- extendable arms operatively connectable both to the underside of the carrier aircraft, and to said forward cross support and said rearward cross support to selectively raise, lower and tilt said respective forward cross support and said rearward cross support up, down and sideways relative to the carrier aircraft to orient said respective forward cross support and said rearward cross support, to enable the orientation of said stinger and said catcher shuttle to enable the selective launching of stored drones in a desired direction and the selective recovery of launched drones from the set of drones from a direction following the flight of the respective drones.

9. The airborne drone launch and recovery apparatus according to claim 8 wherein said extendable arms comprise forward telescoping arms to selectively lift and lower said forward cross support and the forward position of said stinger sheath.

10. The airborne drone launch and recovery apparatus according to claim 9 wherein said forward telescoping arms pivot said forward cross support.

11. The airborne drone launch and recovery apparatus according to claim 8 wherein said extendable arms comprise telescoping arms to selectively lift and lower said rearward cross support and the rearward portion of said stinger sheath.

12. The airborne drone launch and recovery apparatus according to claim 1 and further including a launched drone with an engine to drive a launched drone through the atmosphere, said launched drone having a recovery guide for cooperating with said shuttle to selectively enable the launch of a stored drone and the recovery of a launched drone from or by said airborne drone launch and release apparatus.

* * * * *